US011577178B2

(12) United States Patent
Faris et al.

(10) Patent No.: US 11,577,178 B2
(45) Date of Patent: Feb. 14, 2023

(54) EVAPORATION APPARATUS AND METHOD (71) Applicant: Biotage AB, Uppsala (SE)

(72) Inventors: Adam Faris, Uppsala (SE); Johan Asplund, Uppsala (SE); Olof Eriksson, Uppsala (SE)

(73) Assignee: Biotage AB, Uppsale (SE)

( * ) Notice: Subject to any disclaimer, the term of this patent is extended or adjusted under 35 U.S.C. 154(b) by 395 days.

(21) Appl. No.: 16/093,817

(22) PCT Filed: Apr. 25, 2017

(86) PCT No.: PCT/EP2017/059728
§ 371 (c)(1),
(2) Date: Oct. 15, 2018

(87) PCT Pub. No.: WO2017/186679
PCT Pub. Date: Nov. 2, 2017

(65) Prior Publication Data
US 2019/0134526 A1    May 9, 2019

(30) Foreign Application Priority Data
Apr. 25, 2016  (EP) ..................................... 16166843

(51) Int. Cl.
*B01D 1/12* (2006.01)
*B01D 1/00* (2006.01)
(Continued)

(52) U.S. Cl.
CPC ............. *B01D 1/0082* (2013.01); *B01D 1/14* (2013.01); *B01D 3/346* (2013.01); *B01D 3/42* (2013.01);
(Continued)

(58) Field of Classification Search
CPC ............. G01N 2001/4027; G01N 1/40; G01N 1/4022; B01D 1/0082; B01D 1/14;
(Continued)

(56) References Cited

U.S. PATENT DOCUMENTS 5,100,623 A * 3/1992 Friswell ............... B01D 1/0082
159/16.1
6,146,595 A  11/2000 Mikulsky
(Continued)

FOREIGN PATENT DOCUMENTS

CN     203764299    *  8/2014
EP     2098296 A1     9/2009
(Continued)

OTHER PUBLICATIONS

EPO translation of CN203764299 (Year: 2014).*
"Gas cylinder" Wikipedia published Jul. 4, 2012 accessed at <https://en.wikipedia.org/w/index.php?title=Gas_cylinder&oldid=500585008> (Year: 2012).*
(Continued)

*Primary Examiner* — Stephen Hobson
(74) *Attorney, Agent, or Firm* — Harness, Dickey & Pierce, P.L.C.

(57) ABSTRACT

The present invention relates to evaporation apparatus (100) comprising manifolds provided with at least one nozzle (102), a tank unit (103) for a liquid, and a sample holder configured to be inserted into the tank unit. The sample holder is configured to hold at least one sample in a defined position relative the at least one nozzle a control unit (104) an inlet port (105) configured to be connected to a gas supply, a pressure regulator (106) arranged downstream the inlet port (105). A set value of the pressure regulator (106) is controlled by the control unit (104), a control valve (107) arranged downstream the pressure regulator (106), wherein each of the at least one manifold (101*a-d*) is connected to a
(Continued)

corresponding output port of the control valve. The control valve is controlled by the control unit (104), and the control unit is configured to set the set value of the pressure regulator to a value that causes a predetermined gas flow from each of the at least one nozzle.

11 Claims, 5 Drawing Sheets

(51) Int. Cl.
  *B01D 1/14* (2006.01)
  *G01N 1/40* (2006.01)
  *B01D 3/42* (2006.01)
  *B01D 3/34* (2006.01)

(52) U.S. Cl.
  CPC ............ *B01D 3/4294* (2013.01); *G01N 1/40* (2013.01); *G01N 1/4022* (2013.01); *B01D 1/0094* (2013.01); *B01D 1/12* (2013.01); *G01N 2001/4027* (2013.01)

(58) Field of Classification Search
  CPC ........ B01D 3/346; B01D 3/42; B01D 3/4294; B01D 1/0094; B01D 1/12
  See application file for complete search history.

(56) References Cited

U.S. PATENT DOCUMENTS

| | | | |
|---|---|---|---|
| 6,716,320 | B1 | 4/2004 | Cole |
| 7,910,067 | B2* | 3/2011 | Knight ................ G01N 35/025 |
| | | | 422/562 |
| 8,465,700 | B2* | 6/2013 | Huang .................... F26B 21/00 |
| | | | 422/83 |
| 2001/0020611 | A1 | 9/2001 | Ally et al. |
| 2003/0223916 | A1 | 12/2003 | Testrut et al. |

FOREIGN PATENT DOCUMENTS

| | | |
|---|---|---|
| FR | 2613247 A1 | 10/1988 |
| JP | H11-500957 A | 1/1999 |
| JP | 2000-254401 A | 9/2000 |
| KR | 10-2006-0070636 A | 6/2006 |

OTHER PUBLICATIONS

International Search Report PCT/ISA/210 for International Application No. PCT/EP2017/059728 dated Aug. 21, 2017.
Written Opinion of the International Searching Authority PCT/ISA/237 for International Application No. PCT/EP2017/059728 dated Aug. 21, 2017.
European Search Report for European Patent Application No. 16166843 dated Oct. 7, 2016.

* cited by examiner

EVAPORATION APPARATUS AND METHOD

CROSS-REFERENCE TO RELATED APPLICATIONS

This application is a national phase under 35 U.S.C. § 371 of PCT International Application No. PCT/EP2017/059728 which has an International filing date of Apr. 25, 2017, which claims priority to European Application No. 16166843.9, filed Apr. 25, 2016, the entire contents of each of which are hereby incorporated by reference.

TECHNICAL FIELD

The present invention relates to the area of solvent evaporation, such as for the drying of a sample or for removal of a first solvent in exchange of another. In particular, the present invention relates to an evaporation apparatus for evaporation of a liquid in a test tube by means of a directed gas stream which creates a vortex movement, a method for evaporation of a solvent using the apparatus according to the invention and a system which includes such an apparatus.

BACKGROUND

Evaporation systems can be found in virtually every type of laboratory, from drug discovery to analytical chemistry. One commonly used evaporation method utilizes a directed stream of gas from a nozzle. The directed stream of gas creates a directed vortex down the test tube to the liquid surface where it creates an increased gas/liquid interface and consequently faster evaporation than conventional methods.

In order to achieve an evaporation process that is fast and efficient in terms of gas and used energy, the orientation of the gas stream relative the test tube has been shown to be of importance.

Further, it has also been shown that the vortex movement of the gas flow from the nozzle impacts the evaporation efficiency.

BRIEF DESCRIPTION OF THE OBJECT OF THE INVENTION

The present invention relates to an evaporation apparatus having improved efficiency as compared to the prior art. Thus, one object of the invention is to provide an improved evaporation apparatus which uses directed vortex flow as discussed above, which may allow for an increased control of the evaporation process.

A further object of the present invention is to provide an evaporation apparatus that is more flexible in terms of the sizes of the used test tubes, while maintaining an efficient vortex movement in the test tubes.

SUMMARY

Described herein are evaporation apparatuses that are more flexible and more efficient compared to known prior-art evaporation apparatuses.

The inventors have found that one problem related to the conventionally used solvent evaporator apparatuses is that the gas flow from each nozzle is largely dependent on the pressure in the gas system between the gas inlet and the nozzle. For low gas flow rates, the gas pressure will usually provide the desired flow through the nozzle. However, if the gas flow rate is higher, then the flow resistance of the gas system may restrict the gas flow; which may be counteracted by an overpressure generated in the system. In prior-art systems, the pressure has been controlled by means of a manual pressure regulator and tabular data was used to calculate gas flows through the nozzles. Furthermore, the prior-art systems provided a relatively rough regulation of the gas flow due to the manual adjustment of the pressure.

The present inventors have found that during the evaporation process, the amount of liquid in the sample tube gradually decreases which means that the liquid surface gradually moves away from the nozzle, which causes the vortex movement in the test tube to gradually decrease. According to the present invention, this effect may be reduced or even eliminated by a gradual increase of the gas flow as the liquid surface moves away from the nozzle.

Furthermore, the present invention provides for a flexible sample holder, which may hold one or more test tubes of various diameters and lengths while maintaining the nozzle orientation relative the test tube. This is achieved by means of a test tube holder with a lever mechanism that provides a force on a part of the sidewall of the test tube.

Thus, an evaporator apparatus according to the invention will provide an increased flexibility and efficiency. The evaporator apparatus includes at least one manifold with at least one nozzle, a tank unit for a liquid, a sample holder configured to be inserted into the tank unit, wherein the sample holder is configured to hold at least one sample in a defined position relative the at least one nozzle, a control unit. The evaporator apparatus further includes an inlet port configured to be connected to a gas supply, a pressure regulator arranged downstream the inlet port, wherein a set value of the pressure regulator is controlled by the control unit, a control valve arranged downstream the pressure regulator, wherein each of the at least one manifold is connected to a corresponding output port of the control valve, which output port is controlled by the control unit, the control unit is configured to set the set value of the pressure regulator to a value that causes a predetermined gas flow from each of the at least one nozzle.

The set value of the pressure may depend on the number of activated manifolds connected to the control valve and the predetermined gas flow from the single nozzle.

Further, the sample holder of the evaporator apparatus may comprise a test tube rack which is flexible and provides a defined position of the nozzle relative the sidewall of the test tube. The test tube rack may include at least one compartment for a test tube which comprises an opening configured to receive a test tube, and a spring mechanism comprising a lever. The spring mechanism is configured for an unloaded position in which the lever presses against a lever stop; and a loaded position in which the lever presses a sidewall of an inserted test tube against a part of the opening being configured to receive the test tube.

Additional features and advantages will be set forth in the description which follows, which is not intended to be limiting the invention as defined by the appended claims. It is to be understood that various embodiments e.g. described by different drawings may be combined to achieve one or more objects of the present invention.

BRIEF DESCRIPTION OF THE DRAWINGS

The invention will now be described in more detail with reference to the appended drawings, which constitutes illustrative examples of the invention and not limiting of the scope.

DETAILED DESCRIPTION

Described herein are evaporation apparatuses that are more flexible and more efficient than the prior-art.

The inventors have found that there is a problem with known evaporator apparatuses since the gas flow from each nozzle is largely dependent on the pressure in the gas system between the pressure regulator and the nozzle. For low gas flow rates the gas pressure gives the desired flow through the nozzle. However, if the gas flow rate is high the flow resistance of the gas system will restrict the gas flow; this may be counteracted by an overpressure generated in the system. In prior-art systems the pressure were controlled by means of a manual pressure regulator and some sort of tabular data were used to calculate gas flows through the nozzles. Furthermore, the prior-art systems provided a rough regulation of the gas flow by manually adjusting the pressure in the gas system. The inventors have found that during the evaporation process the amount of liquid in the sample tube gradually decreases which means that the liquid surface gradually moves away from the nozzle hence the vortex movement in the test tube gradually decreases. This effect may be counteracted by gradually increasing the pressure in the gas system as the liquid surface moves away from the nozzle.

Furthermore, the invention provides a test tube holder which may hold or fix test tubes of various diameters and lengths in a precise orientation relative the nozzle. This is achieved by means of a test tube holder provided with a lever capable of exerting a force on a part of the sidewall of the test tube to push or press the test tube against a part of the test tube holder.

Figure 1:
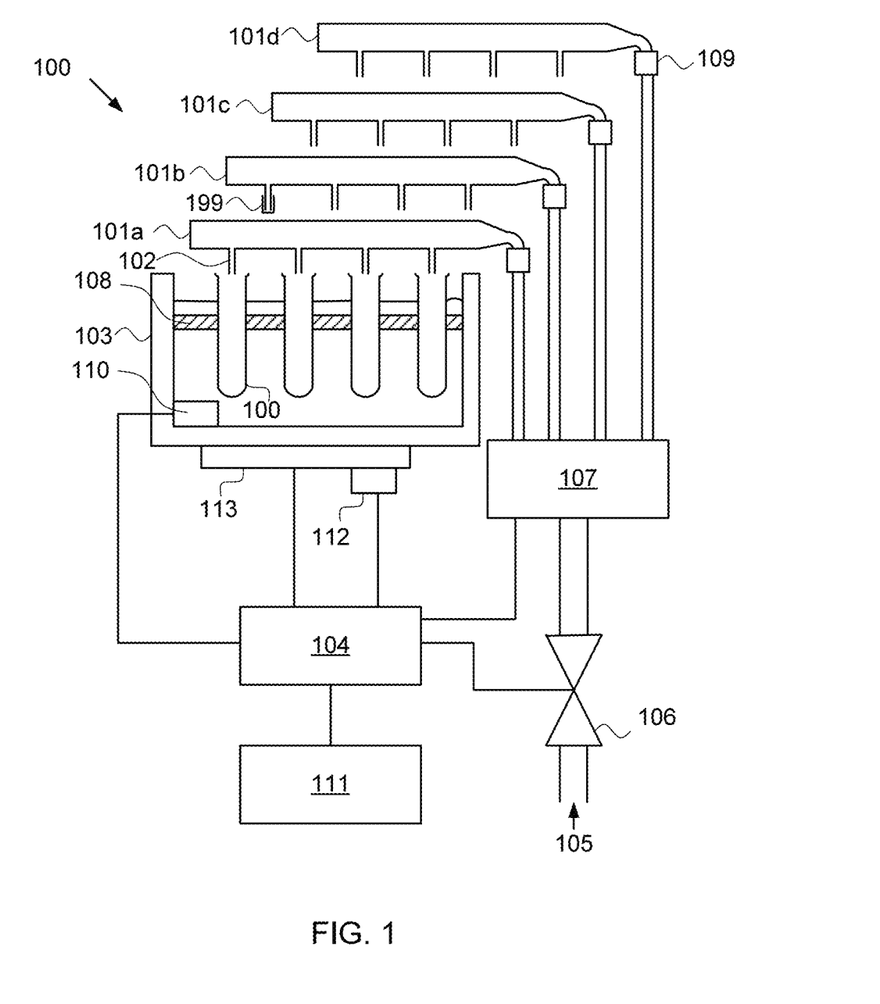
FIG. 1 is a schematic block drawing of an evaporation apparatus according to the invention, which has been connected to units for control of an evaporation process.

In FIG. 1, the evaporation apparatus, generally designated 100, includes at least one manifold 101a-d with at least one nozzle 102, a tank unit 103 for a liquid with an associated heater 113 for the liquid, a sample holder 108 configured to be inserted into the tank unit. The sample holder is configured to hold at least one sample in a defined position relative the at least one nozzle. The evaporation apparatus further includes a control unit 104 configured to control the temperature of the liquid in the tank by means of the heater, an inlet port 105 configured to be connected to a gas supply, and a pressure regulator 106 arranged downstream the inlet port 105. A set value of the pressure regulator 106 is controlled by the control unit 104. The evaporation apparatus includes a control valve 107 arranged downstream the pressure regulator 106, wherein each of the at least one manifold 101a-d is connected to a corresponding output port of the control valve, which control valve is controlled by the control unit 104. The control unit is configured to set the set value of the pressure regulator to a value that causes a predetermined gas flow from each of the at least one nozzle 102, wherein the set value of the pressure depends on the number of activated manifolds connected to the control valve and the predetermined gas flow from the single nozzle. The control unit 104 is operable to select which manifold to flow gas through by means of the control valve. It is also possible to plug individual nozzles by means of a cap 199.

The evaporation system may comprise a temperature sensor 110 connected to the control unit 104. This temperature sensor 110 is arranged to measure the temperature of the liquid in the tank unit 103. The position of this temperature sensor 110 may be distanced from the bottom of the tank unit, allowing for inspection of the liquid level.

This may be determined by the control unit if the heater is activated but no temperature increase is detected by the temperature sensor.

Further, the evaporation system may include a plurality of temperature sensors arranged at different depths in the tank unit. This way a liquid level indicator is achieved. A liquid level indicator may be useful if the evaporation apparatus includes a second tank unit and a pump device in fluid communication with the tank unit, the pump device can be controlled by the control unit. In this way the liquid level of the tank unit can be controlled and maintained constant even if the inserted sample holder has different volumes. Of course other types of liquid level indicators can be used such as floating devices, various types of optical detectors etc.

Further, the evaporation apparatus may include an additional temperature sensor 112 configured to sense the temperature of the heater 113. This way the heater is protected from over-temperatures, which can occur if the tank unit becomes empty which means that the temperature sensor in the tank unit does not sense the temperature.

Further, the control unit may be configured to gradually increase the gas pressure from the pressure regulator to the control valve unit. This way the vortex movement is gradually built up which means that splatter can be minimized.

Further, the control unit may be configured to increase the gas pressure from the pressure regulator gradually over a defined time. This way an optimum vortex movement can be achieved through the whole evaporation.

Further, the control valve unit 107 may comprise a plurality of electrically activated valves, each valve being connected to a corresponding manifold 101a-d. This connection can be achieved by means of quick-fit connectors 109, which allows quick replacement of the manifold which may be useful if manifolds with different pitch between the nozzles are used. This allows the control unit to control which manifold or manifolds to activate.

Further, the pressure regulator 106 may comprise a pressure sensor which is connected to the control unit 104. This way a true readout of the flow from each nozzle in the evaporator apparatus may be presented on a display unit 111.

Furthermore, the tank unit may be in fluid communication with a UV device being configured to prevent organic growth in the tank unit 103. A UV device may alternatively, or additionally, be used for heating of the tank.

Figure 2:
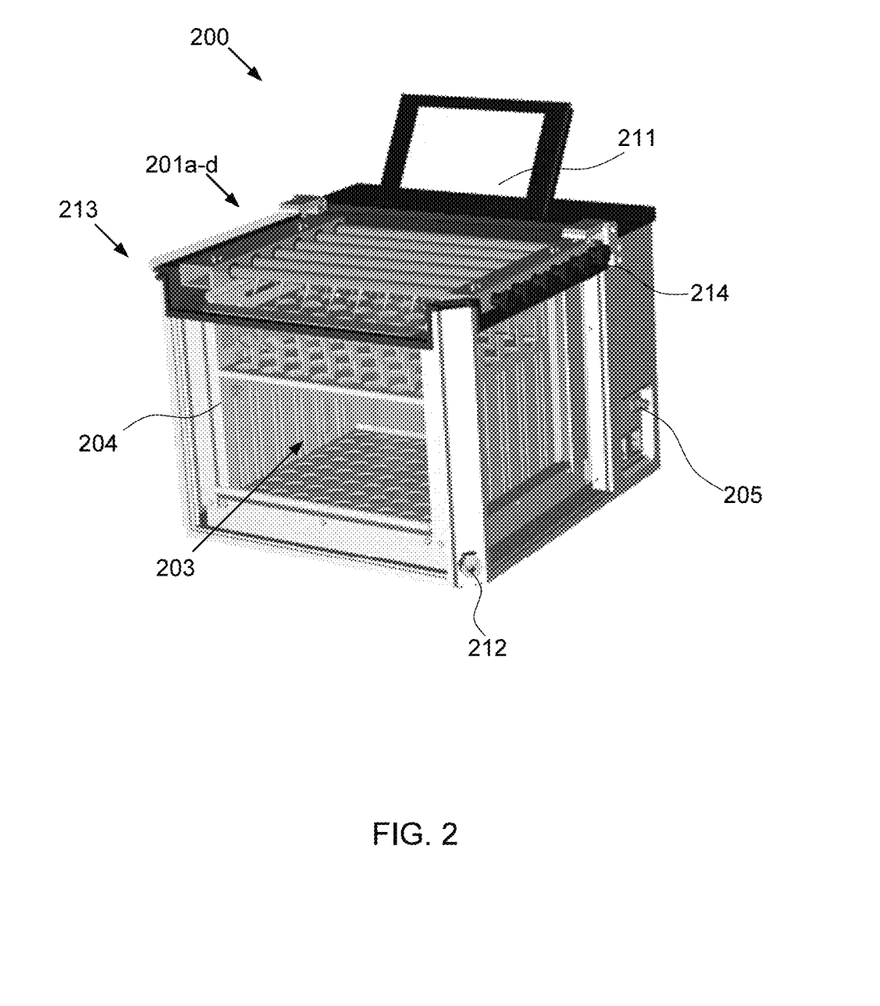
FIG. 2 is a perspective view of an element of an evaporation apparatus according to the invention, and specifically of a tank wherein a tube rack as shown in FIG. 1 may be inserted.

FIG. 2 illustrates an illustrative evaporator apparatus according to the invention, generally designated 200, in a perspective view. The tank unit 203 has transparent sidewalls which allow visual inspection of the evaporation process. Furthermore, the tank unit 203 is provided a drain valve 212 which allows the tank unit 203 to be emptied without turning the tank unit upside down.

The manifolds 201a-d is removable connected to a hinged lid 213 which allows easy access to the tank unit 203. The manifolds are also provided with handles 214 which are configured to manoeuvre the manifolds in an axial direction of the manifolds. This allows a precise adjustment of the nozzles relative a test tube rack 204.

The display unit 211 may be provided a touchscreen interface. This allows easy control of the evaporator apparatus.

In another embodiment, the evaporator apparatus is provided a fan configured to transport the evaporated substances to an exhaust pipe, which may be connected to an external ventilation system. This way the evaporator apparatus can be placed on a bench top and does not need to be placed in a fume hood.

Figure 3:
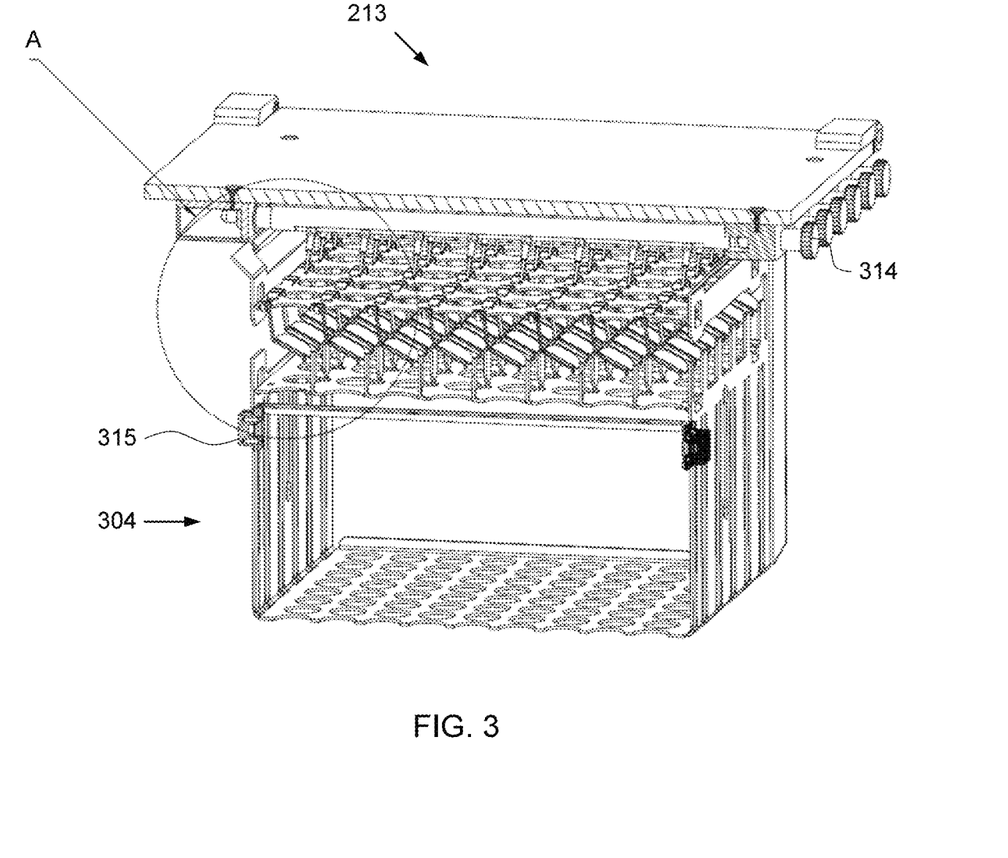
FIG. 3 is a perspective view of a lid and a test tube rack of an evaporation apparatus according to the invention.

In FIG. 3 the lid 213 with the manifolds is illustrated together with the test tube rack 304 in a cut open view. Each manifold has an associated handle 314 which allows for movement of the manifold in an axial direction of the manifold. The test tube rack 304 includes an adjustable element 315, which slides along the edges of the test tube rack and is lockable in a desired position. This allows test tubes of different length to be held and fitted in the test tube rack 304. In order to further illustrate the beneficial features of the test tube rack 204 in cooperation with the nozzles, a region A is magnified and illustrated in FIG. 4.

Figure 4:
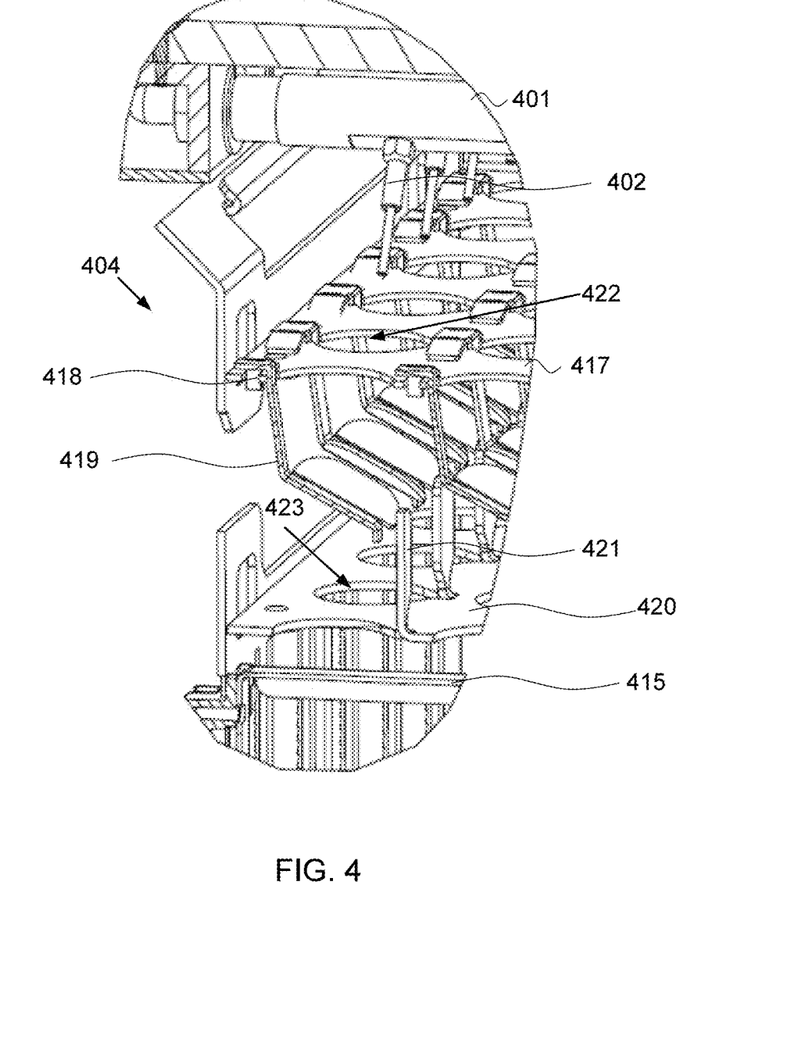
FIG. 4 illustrates a magnified section A from FIG. 3 which discloses a cross sectional view of a test tube rack and a manifold, according to the invention.
Figure 5:
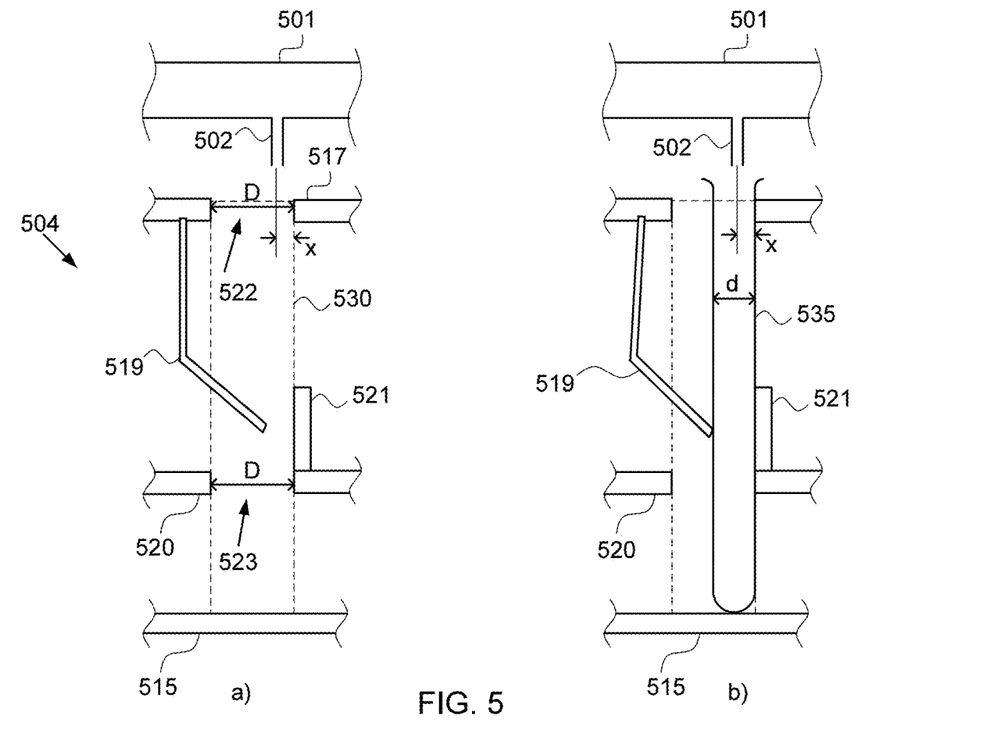
FIG. 5a) illustrates a part of the test tube rack with the lever in an unloaded position, according to the invention.
FIG. 5b) illustrates a part of the test tube rack with the lever in a loaded position, according to the invention.

FIG. 4 is a cross sectional perspective view A from FIG. 3 illustrated. In this view, the manifold 401 with a nozzle 402 is directed towards an opening 422 of the test tube rack 404, which opening 422 is configured to receive a test tube. The test tube rack 404 includes an upper element 417 with the opening being configured to receive a test tube. The test tube rack 404 further includes a lever 419 attached to the upper element 417. The test tube rack 404 includes a middle element 420 with an opening 423 corresponding to the opening 422 in the upper element 417. The middle element also includes a guide element 421 for guiding a test tube during insertion. The lever may comprise a bendable region and a region configured to engage an inserted test tube. In other embodiments, the lever 419 comprises a spring mechanism 418. In order to further elucidate the function of test tube rack a more functional description is provided with reference to FIG. 5.

FIG. 5a) is a schematic illustration of the test tube rack 504 and the manifold 501 with a nozzle 502. The test tube rack 504 includes at least one compartment 530 for a test tube 535, the test tube rack includes an opening 522 in the upper element 517 being configured to receive a test tube 535. The test tube rack comprises a lever 519, wherein the lever 519 is configured for an unloaded position in which the lever extends into the compartment 530. The nozzle is located a distance x from the sidewall of the opening 522, which opening has a main axis with a length D.

In FIG. 5b), a loaded position is illustrated in which the lever 519 presses a sidewall of an inserted test tube 535 against parts of the openings 522,523 and the guide element 521. The guide element is provided for guiding a test tube through the opening 523, while the lever presses the test tube against the guide element. During insertion of the test tube through opening 522 the closed end of the test tube pushes the lever 519 until the lever 519 starts to slide along the sidewall of the test tube until the closed end of the test tube is in contact with the adjustable element 515. This way a very precise alignment of the test tube relative the nozzle is provided, which is illustrated by the distance x from a sidewall of the test tube 535 with a diameter d.

Figure 6:
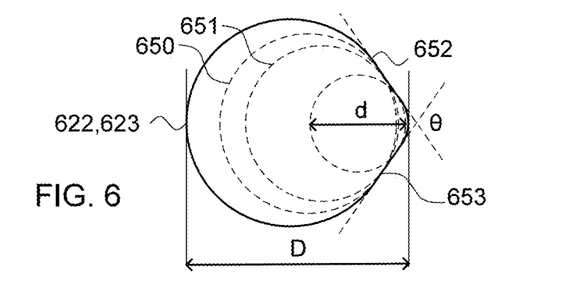
FIG. 6 illustrates the opening configured to receive a test tube, according to the invention.

In FIG. 6 is an embodiment of a geometry for the openings 622, 623 disclosed, the openings comprises two opposite sidewalls 652,653 with a varying distance there between. Thus, the sidewalls have an intermediate angle of $\theta$. This angle $\theta$ is in the interval from 90° to 130°, most preferably 110°. This way, test tubes with different diameters d can be fitted in the opening with the main axis D. Small final adjustments of the nozzle position relative the open end of the test tube can be adjusted by means of the handle 314 which controls the axial position of the manifold 501 and thereby the position of the nozzle. As illustrated in FIG. 6, test tubes with different diameters 650,651 may be aligned according to the invention to the nozzle with good precision.

Figure 7:
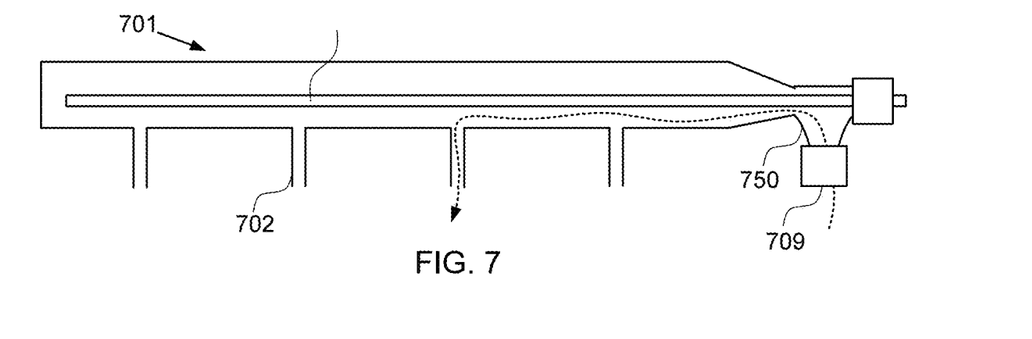
FIG. 7 illustrates a manifold with a heater, according to the invention.

In FIG. 7 is an alternative manifold 701 disclosed, which includes a heating element 702 inserted into the manifold 701 via a T-connector 750. This way the gas in the manifold can be heated before exit through the nozzle 702 which is beneficial for the evaporation speed. Thus, an advantage of the present invention is that it may utilize pre-heated gas, which again may improve the efficiency as compared to conventional solvent evaporators.

However, the gas may be heated with other or additional heating means arranged downstream the inlet.

The lever may be manufactured in a plastic material.

The present invention also relates to a method of evaporating a solvent using an evaporator having at least one tube presented in a heated tank and using a vortex gas flow provided to each tube via nozzle(s), wherein the reducing volume in each test tube is compensated for by a gradual change in the gas flow rate, as described above in relation to the apparatus according to the invention. In one embodiment, the gas flow rate is gradually increased. In an advantageous embodiment, the method also provides pre-heated gas to the test tubes, to further improve the evaporation efficiency. In a specific embodiment, the tank is heated by UV.

In its broadest aspect, the present method may utilize a conventional evaporator provided with a control unit allowing for the herein described compensation for the declining solvent surface in the tube(s). In a specific aspect, the method uses an evaporator apparatus according to the invention.

The invention claimed is:

1. An evaporation apparatus, comprising:
   at least one manifold with at least one nozzle;
   a tank unit for a liquid,
   a sample holder configured to be inserted into the tank unit, wherein the sample holder is configured to hold at least one sample in a defined position relative to the at least one nozzle;
   an inlet port configured to be connected to a gas supply;
   a pressure regulator arranged downstream of the inlet port, wherein a set value of the pressure regulator is controlled by an electronic control unit;
   a control valve arranged downstream of the pressure regulator, wherein each of the at least one manifold is connected to a corresponding output port of the control valve, which control valve is controlled by the electronic control unit; and
   the electronic control unit configured to set the set value of the pressure regulator to a value that causes a predetermined gas flow that gradually increases from each of the at least one nozzle.

2. An evaporation apparatus according to claim 1, wherein the set value of the pressure regulator depends on the number of connected manifolds connected to the control valve and the predetermined gas flow from the at least one nozzle.

3. An evaporator apparatus according to claim 1, wherein the electronic control unit is configured to gradually increase the gas flow from a first low pressure to the set value.

4. An evaporator apparatus according to claim 1, wherein each manifold is adjustable, in a longitudinal direction, by means of a handle.

5. An evaporator apparatus according to claim 1, wherein the sample holder comprises:
   a test tube rack comprising a compartment for a test tube which comprises an opening configured to receive the test tube; and
   a lever configured for:
      an unloaded position in which the lever extends into the compartment; and
      a loaded position in which the lever presses a sidewall of the test tube against a part of the opening.

6. An evaporator apparatus according to claim 5, wherein the test tube rack comprises:
   an upper structure comprising the opening configured to receive the test tube, wherein the lever is operatively connected to the upper structure and extends downwardly and at least partly into the compartment;
   a middle structure comprising a second opening configured to receive the test tube, the middle structure further comprises a guide structure configured to guide the test tube through the second opening during insertion.

7. An evaporator apparatus according to claim 5, wherein the test tube rack comprises an adjustable structure arranged below an upper structure and a middle structure, which the adjustable structured is vertically adjustable in order to allow test tubes of different lengths to be used in the test tube rack.

8. An evaporator apparatus according to claim 5, wherein the opening comprises sidewalls with an intermediate angle $\theta$.

9. An evaporator apparatus according to claim 8, wherein the intermediate angle $\theta$ is in an interval from 90° to 130°.

10. An evaporator apparatus according to claim 5, wherein the lever is made of a plastic material.

11. A method for evaporating a solvent, wherein an evaporator apparatus according to claim 1 is used.

* * * * *